United States Patent
Zhang et al.

(10) Patent No.: US 11,974,172 B2
(45) Date of Patent: *Apr. 30, 2024

(54) SERVICE NODE UPDATING METHOD, TERMINAL DEVICE, AND NETWORK-SIDE DEVICE

(71) Applicant: VIVO MOBILE COMMUNICATION CO., LTD., Guangdong (CN)

(72) Inventors: Yanxia Zhang, Chang'an Dongguan (CN); Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,077

(22) Filed: May 5, 2023

(65) Prior Publication Data

US 2023/0276308 A1 Aug. 31, 2023

Related U.S. Application Data

(63) Continuation of application No. 17/174,140, filed on Feb. 11, 2021, now Pat. No. 11,689,969, which is a (Continued)

(30) Foreign Application Priority Data

Aug. 17, 2018 (CN) .......................... 201810942878.5

(51) Int. Cl.
*H04W 76/12* (2018.01)
*H04L 41/082* (2022.01)
(Continued)

(52) U.S. Cl.
CPC ....... *H04W 36/0016* (2013.01); *H04L 41/082* (2013.01); *H04W 36/08* (2013.01);
(Continued)

(58) Field of Classification Search
None
See application file for complete search history.

(56) References Cited

U.S. PATENT DOCUMENTS

2016/0255675 A1  9/2016  Van Lieshout et al.
2017/0332301 A1  11/2017 Horn et al.
(Continued)

FOREIGN PATENT DOCUMENTS

CN  103582054 A  2/2014
CN  106162730 A  11/2016
(Continued)

OTHER PUBLICATIONS

International Search Report and Written Opinion dated Nov. 19, 2019 as received in application No. PCT/CN2019/101020.
(Continued)

*Primary Examiner* — Gregory B Sefcheck
(74) *Attorney, Agent, or Firm* — BROOKS KUSHMAN P.C.

(57) ABSTRACT

A service node updating method is provided. The method is performed by a terminal device and includes: receiving configuration information, where the configuration information includes first connectivity configuration information used to maintain both a connection to a source node and a connection to a target node in a service node updating procedure and second connectivity configuration information used to release the connection to the source node and connect to the target node; processing, by applying the first connectivity configuration information, a layer 2 protocol entity corresponding to a bearer between the terminal device and the source node, to reconfigure the bearer as a source node split bearer; and processing, by applying the second connectivity configuration information, a layer 2 protocol
(Continued)

entity corresponding to the bearer, to reconfigure the source node split bearer as a target node bearer.

20 Claims, 6 Drawing Sheets

Related U.S. Application Data continuation of application No. PCT/CN2019/101020, filed on Aug. 16, 2019.

(51) Int. Cl.
*H04W 36/00* (2009.01)
*H04W 36/08* (2009.01)
*H04W 76/30* (2018.01)
*H04W 80/02* (2009.01)

(52) U.S. Cl.
CPC .......... *H04W 76/12* (2018.02); *H04W 76/30* (2018.02); *H04W 80/02* (2013.01)

(56) References Cited

U.S. PATENT DOCUMENTS

| | | |
|---|---|---|
| 2018/0083688 A1 | 3/2018 | Agiwal |
| 2018/0092014 A1 | 3/2018 | Gao et al. |
| 2018/0098250 A1 | 4/2018 | Vrzic et al. |
| 2018/0220336 A1 | 8/2018 | Hong |
| 2018/0227805 A1* | 8/2018 | Jang ................. H04W 36/0055 |
| 2018/0227819 A1 | 8/2018 | Lee |
| 2018/0302834 A1 | 10/2018 | Zhang |
| 2018/0324642 A1 | 11/2018 | Yu et al. |
| 2018/0324651 A1 | 11/2018 | Tenny |
| 2019/0349822 A1 | 11/2019 | Kim |
| 2019/0373519 A1 | 12/2019 | Yiu et al. |
| 2020/0008113 A1 | 1/2020 | Chen |
| 2020/0022043 A1 | 1/2020 | Pelletier |
| 2020/0022213 A1 | 1/2020 | Han et al. |
| 2020/0037382 A1 | 1/2020 | Xiao et al. |
| 2020/0084682 A1 | 3/2020 | Wang et al. |
| 2020/0154499 A1 | 5/2020 | Futaki |
| 2020/0178332 A1 | 6/2020 | Sharma |
| 2020/0187064 A1 | 6/2020 | Susitaival |
| 2020/0196374 A1* | 6/2020 | Lim ..................... H04W 80/02 |
| 2020/0205042 A1 | 6/2020 | Ryu |
| 2020/0275325 A1 | 8/2020 | Li |
| 2020/0296637 A1 | 9/2020 | Teyeb |
| 2020/0367101 A1 | 11/2020 | Paladugu et al. |
| 2020/0374690 A1 | 11/2020 | Yao et al. |
| 2021/0099930 A1 | 4/2021 | Yao et al. |
| 2022/0225453 A1* | 7/2022 | Kim ..................... H04W 28/06 |
| 2022/0232402 A1* | 7/2022 | Song ................... H04B 17/318 |
| 2022/0322418 A1* | 10/2022 | Kim ..................... H04W 28/18 |

FOREIGN PATENT DOCUMENTS

| | | |
|---|---|---|
| CN | 106162774 A | 11/2016 |
| CN | 107113677 A | 8/2017 |
| CN | 108282824 A | 7/2018 |
| CN | 108307538 A | 7/2018 |
| JP | 2017-501649 A | 1/2017 |
| KR | 10-2018-0013862 A | 2/2018 |
| WO | 2016/195735 A1 | 12/2016 |
| WO | 2018/059557 A1 | 4/2018 |
| WO | 2018/113410 A1 | 6/2018 |
| WO | 2018/142308 A1 | 8/2018 |
| WO | 2018/144758 A1 | 8/2018 |
| WO | 2020/231493 A1 | 11/2020 |

OTHER PUBLICATIONS

ZTE Corporation., "Discussion on data forwarding in mobility enhancement solutions," 3GPP TSG-RAN WG3 Meeting #92, R3-161144, pp. 1-5, (May 23-27, 2016).

Ericsson., "Bearer type switching in dual connectivity," 3GPP TSG-RAN WG2 #97, Tdoc R2-1700909, pp. 1-4, (Feb. 17, 2017).

Huawei, et al., "SgNB to MgNB reconfiguration for 0ms interruption handover," 3GPP TSG-RAN WG2 #97bis, R2-1703381, pp. 1-4, (Apr. 3-7, 2017).

Huawei, et al., "Consideration on bearer type change for unified split bearer," 3GPP TSG-RAN WG2 NR Adhoc#2, R2-1707404, pp. 1-8, (Jun. 27-29, 2017).

ZTE Corporation., "Remaining issues of bearer type harmonization," 3GPP TSG-RAN WG2 Meeting #99bis, R2-1710325, pp. 1-4, (Oct. 13, 2017).

Samsung., "Remaining issues for Allowed Bearer type changes," 3GPP TSG-RAN WG2 2017 RAN2#99bis Meeting, R2-1710788, pp. 1-3, (Oct. 13, 2017).

Huawei, et al., "Security key change without L2 reset," 3GPP TSG-RAN WG2 #101, R2-1802474 (Revision of R2-1800552), pp. 1-3, (Feb. 26-Mar. 2, 2018).

MediaTek Inc., "Mobility Enhancement for '0ms Interruption' HO," 3GPP TSG-RAN2#101, R2-1802408 (Resubmission of R2-1800630), pp. 1-6, (Feb. 26-Mar. 2, 2018).

Qualcomm Incorporated., "NR 0ms Interruption HO," 3GPP TSG-RAN WG2 Meeting #101, R2-1803662, pp. 1-8, (Feb. 26-Mar. 2, 2018).

Ericsson., "Centralised User Plane—Dual Connectivity," 3GPP TSG-RAN WG3 Meeting #99, R3-181267, pp. 1-7, (Mar. 2, 2018).

ZTE., "Discussion on PDCP packet duplication in LTE," 3GPP TSG RAN WG2 Meeting #101, R2-1801964, pp. 1-4, (Mar. 2, 2018).

Vivo., "Small correction about bear type change," 3GPP TSG-RAN WG2 Meeting #103, R2-1811914, pp. 1-3, (Aug. 20-24, 2018).

CN First Office Action dated Jun. 19, 2020 as received in Application No. 201810942878.5.

CN Second Office Action dated Feb. 4, 2021 as received in Application No. 201810942878.5.

CN Third Office Action dated Jun. 4, 2021 as received in Application No. 201810942878.5.

Extended European Search Report dated Oct. 13, 2021 as received in Application No. 19850568.7.

CN Decision to Grant dated Jan. 6, 2022 as received in Application No. 201810942878.5.

KR Office Action dated Mar. 10, 2022 as received in Application No. 10-2021-7007809.

JP First Office Action dated Apr. 12, 2022 as received in Application No. 2021-507805.

JP Second Office Action dated Aug. 16, 2022 as received in Application No. 2021-507805.

KR decision to Grant Dated Sep. 16, 2022 as received in Application No. 10-2021-7007809.

U.S. Non-Final Office Action dated Sep. 23, 2022 as received in U.S. Appl. No. 17/174,140.

* cited by examiner

SERVICE NODE UPDATING METHOD, TERMINAL DEVICE, AND NETWORK-SIDE DEVICE

CROSS-REFERENCE TO RELATED APPLICATIONS

This application the benefit of and is a continuation application of U.S. patent application Ser. No. 17/174,140 filed on Feb. 11, 2021, now issued as U.S. Pat. No. 11,689,969 and is continuation application of PCT International Application No. PCT/CN2019/101020 filed on Aug. 16, 2019, which claims priority to Chinese Patent Application No. 201810942878.5, filed in China on Aug. 17, 2018, which are incorporated in their entireties by reference herein.

TECHNICAL FIELD

This disclosure relates to the communications field, and in particular, to a service node updating method, a terminal device, and a network-side device.

BACKGROUND

In a related mobile communications system, when a terminal device moves from one cell (within coverage of a base station) to another cell, or when communication quality in a cell deteriorates due to external interference, a service node usually needs to be changed to maintain communication of the terminal device. When updating the service node, the terminal device needs to be disconnected from a source node first before the terminal device can establish a new connection to a target node. Therefore, this service node updating manner causes interruption of user plane data which affects user experience.

With development of mobile communications technologies, a 5th Generation (5G) mobile communications system emerges. To improve radio resource utilization and reduce a system handover delay, so as to improve user experience and system performance, in the 5G system, a terminal device (which may also be referred to as user equipment (UE)) may use a dual-connectivity (DC) architecture, and service node updating is implemented based on a multi-connectivity capability of the terminal device, thereby ensuring that user plane data is continuous without interruption and satisfying a service requirement of low-latency service data.

Therefore, there is an urgent need to provide a service node updating method to process a layer 2 protocol entity corresponding to a data radio bearer in a service node updating procedure.

SUMMARY

According to a first aspect, a service node updating method is provided, where the method is performed by a terminal device and includes:
  receiving configuration information, where the configuration information includes first connectivity configuration information used to maintain both a connection to a source node and a connection to a target node in a service node updating procedure and second connectivity configuration information used to release the connection to the source node and connect to the target node;
  processing, by applying the first connectivity configuration information, a layer 2 protocol entity corresponding to a bearer between the terminal device and the source node, to reconfigure the bearer as a source node split bearer; and
  processing, by applying the second connectivity configuration information, a layer 2 protocol entity corresponding to the bearer, to reconfigure the source node split bearer as a target node bearer.

According to a second aspect, a service node updating method is provided, where the method is performed by a network-side device, the network-side device includes a source node in a service node updating procedure, and the method includes:
  sending configuration information, where the configuration information includes first connectivity configuration information used to maintain both a connection to the source node and a connection to a target node in the service node updating procedure and second connectivity configuration information used to release the connection to the source node and connect to the target node.

According to a third aspect, a service node updating method is provided, where the method is performed by a network-side device, the network-side device includes a target node in a service node updating procedure, and the method includes:
  receiving a first source node status transfer message sent by a source node in the service node updating procedure and a first PDCP PDU received from a source node split bearer;
  updating a sending status of a sending PDCP entity in the target node based on the first source node status transfer message and the first PDCP PDU;
  receiving a second source node status transfer message sent by the source node and a second PDCP PDU received from a target bearer; and
  updating a receiving status of a receiving PDCP entity in the target node based on the second source node status transfer message and the second PDCP PDU.

According to a fourth aspect, a terminal device is provided, where the terminal device includes:
  a configuration message receiving module, configured to receive configuration information, where the configuration information includes first connectivity configuration information used to maintain both a connection to a source node and a connection to a target node in a service node updating procedure and second connectivity configuration information used to release the connection to the source node and connect to the target node;
  a first reconfiguration module, configured to process, by applying the first connectivity configuration information, a layer 2 protocol entity corresponding to a bearer between the terminal device and the source node, to reconfigure the bearer as a source node split bearer; and
  a second reconfiguration module, configured to process, by applying the second connectivity configuration information, a layer 2 protocol entity corresponding to the bearer, to reconfigure the source node split bearer as a target node bearer.

According to a fifth aspect, a network-side device is provided, where the network-side device includes a source node in a service node updating procedure, and the network-side device includes:
  a configuration information sending module, configured to send configuration information, where the configuration information includes first connectivity configuration information used to maintain both a connection to the source node and a connection to a target node in the service node updating procedure and second connectivity configuration information used to release the connection to the source node and connect to the target node.

According to a sixth aspect, a network-side device is provided, where the network-side device includes a target node in a service node updating procedure, and the network-side device includes:

a first source node status transfer message and PDCP PDU receiving module, configured to receive a first source node status transfer message sent by a source node in the service node updating procedure and a first PDCP PDU received from a source node split bearer;

a sending status updating module, configured to update a sending status of a sending PDCP entity in the target node based on the first source node status transfer message and the first PDCP PDU;

a second source node status transfer message and PDCP PDU receiving module, configured to receive a second source node status transfer message sent by the source node and a second PDCP PDU received from a target bearer; and a receiving status updating module, configured to update a receiving status of a receiving PDCP entity in the target node based on the second source node status transfer message and the second PDCP PDU.

According to a seventh aspect, a terminal device is provided, and includes a memory, a processor, and a computer program stored in the memory and capable of running on the processor, where when the computer program is executed by the processor, the steps of the method according to the first aspect are implemented.

According to an eighth aspect, a computer-readable storage medium is provided, where the computer-readable storage medium stores a computer program, and when the computer program is executed by a processor, the steps of the method according to the first aspect are implemented.

According to a ninth aspect, a network-side device is provided, and includes a memory, a processor, and a computer program stored in the memory and capable of running on the processor, where when the computer program is executed by the processor, the steps of the method according to the second aspect are implemented.

According to a tenth aspect, a computer-readable storage medium is provided, where the computer-readable storage medium stores a computer program, and when the computer program is executed by a processor, the steps of the method according to the second aspect are implemented.

According to an eleventh aspect, a network-side device is provided, and includes a memory, a processor, and a computer program stored in the memory and capable of running on the processor, where when the computer program is executed by the processor, the steps of the method according to the third aspect are implemented.

According to a twelfth aspect, a computer-readable storage medium is provided, where the computer-readable storage medium stores a computer program, and when the computer program is executed by a processor, the steps of the method according to the third aspect are implemented.

BRIEF DESCRIPTION OF DRAWINGS

The drawings described herein are used to provide a further understanding about this disclosure, and constitute a part of this disclosure. Exemplary embodiments of this disclosure and descriptions thereof are used to explain this disclosure, but do not constitute any inappropriate limitation on this disclosure.

DESCRIPTION OF EMBODIMENTS

Figure 1:
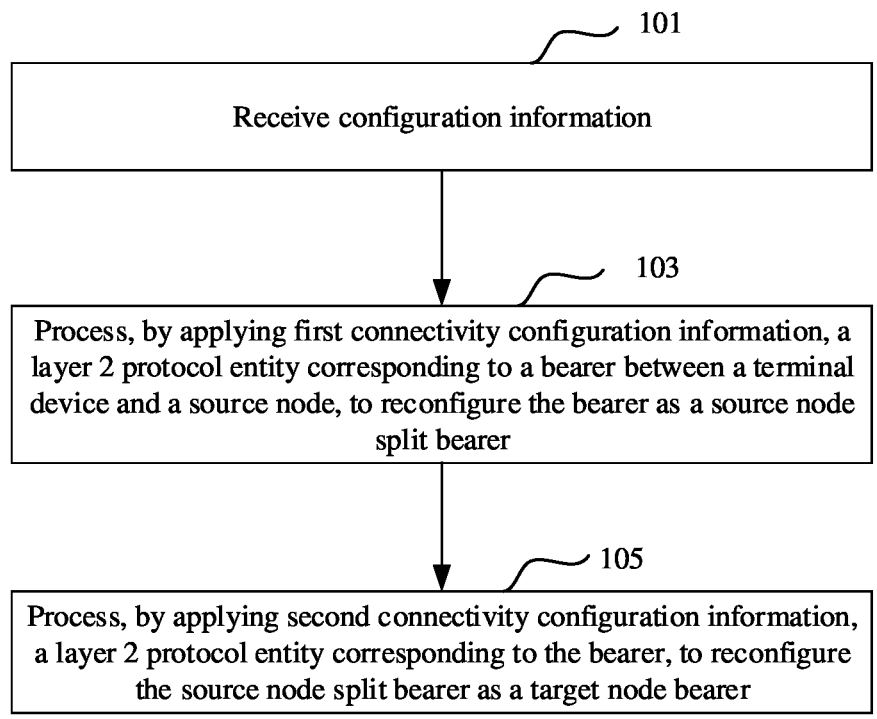
FIG. 1 is a schematic flowchart of a service node updating method performed by a terminal device according to an embodiment of this disclosure.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

The technical solutions of this disclosure may be applied to various communications systems, for example, a global system for mobile communications (GSM), a code division multiple access (CDMA) system, wideband code division multiple access (WCDMA), general packet radio service (GPRS), long term evolution (LTE) or long term evolution advanced (LTE-A), and New Radio (NR).

User equipment (UE), which may also be referred to as a terminal device (Mobile Terminal), a mobile terminal device, or the like, may communicate with one or more core networks through a radio access network (for example, RAN). The terminal device may be, for example, a mobile phone (or referred to as a "cellular" phone) or a computer with a terminal device. For example, the terminal device may be a portable, pocket-sized, handheld, computer built-in, or in-vehicle mobile apparatus, which exchanges voice and/or data with the radio access network.

A base station may be a base transceiver station (BTS) in GSM or CDMA, or may be a NodeB in WCDMA, or may be an evolved NodeB (eNB or e-NodeB) in LTE or a 5G NodeB (gNB), which is not limited in this disclosure. In the following embodiments, the gNB is used as an example for description.

In a related mobile communications system, a terminal device uses a single connectivity (SC) architecture. When the terminal device moves from one cell (within coverage of a base station) to another cell, or when communication quality in a cell deteriorates due to external interference, a service node usually needs to be changed to maintain communication of the terminal device. When updating the service node, the terminal device needs to be disconnected from a source node first before the terminal device can establish a new connection to a target node. Therefore, this service node updating manner causes user plane data interruption and affects user experience.

In a 5G system, a terminal device (which may also be referred to as user equipment (UE)) uses a dual-connectivity (DC) architecture to improve radio resource utilization and reduce a system handover delay, so as to improve user and system performance. The dual connectivity DC architecture includes two cell groups: a master cell group (MCG) and a secondary cell group (SCG). The master cell group MCG corresponds to a master node (MN) on a network side, and the secondary cell group SCG corresponds to a secondary node (SN) on the network side. Further, the master cell group MCG includes a primary cell (PCell) and a secondary cell (SCell); and the secondary cell group SCG includes a primary secondary cell (PSCell) and a secondary cell (SCell). The primary cell PCell and the primary secondary cell PSCell may also be collectively referred to as a special cell (SpCell, which means the primary cell PCell in the master cell group (MCG) or the secondary cell group (SCG)).

Therefore, in the 5G system, service node updating can be implemented based on a multi-connectivity capability of the terminal device. Therefore, the terminal device does not need to be disconnected from a source node during service node updating, but is disconnected from the source node after a service node is successfully updated to a target node, so that user plane data can be continuous without interruption.

To achieve the foregoing objective, in a service node updating method provided by an embodiment of this disclosure, a manner of processing a layer 2 protocol entity corresponding to a data radio bearer in a service node updating procedure is provided to ensure that the user plane data is continuous without interruption.

The technical solutions provided by the embodiments of this disclosure are hereinafter described in detail with reference to accompanying drawings.

Embodiment 1

Referring to FIG. 1, this embodiment of this disclosure provides a service node updating method. The method is performed by a terminal device and may include the following steps.

Step 101: Receive configuration information.

It should be noted that the service node updating method provided by this embodiment of this disclosure is applicable to a plurality of scenarios in which service node updating needs to be performed, for example, a service node handover (Handover) is performed, or a secondary node change (SN change) is performed. Specifically, in a service node handover (Handover) scenario, a source node may be specifically a source base station, and a target node may be specifically a target base station. In a secondary node change (SN change) scenario, a source node may be specifically a source secondary node SN, and a target node may be specifically a target secondary node SN. It may be understood that a network-side device that initiates service node updating may also vary depending on different connectivity architectures of the terminal device before service node updating.

For example, if the terminal device is connected to only one service node (in this case, it may be understood that the terminal device is in a single-connectivity architecture) before service node updating, a source node (which may be specifically a source base station) delivers configuration information to the terminal device.

For another example, if the terminal device is connected to two nodes (in this case, it may be understood that the terminal device is in a multi-connectivity architecture) before service node updating, a master node MN of the two nodes may deliver configuration information. If a signal radio bearer 3 (SRB3) has been established between a secondary node SN of the two nodes and the terminal device, the secondary node SN may directly deliver configuration information to the terminal device, to facilitate a secondary node change (SN change).

Therefore, correspondingly, the configuration information received by the terminal device may come from the source node that has established a connection to the terminal device, for example, the source base station or the source secondary node SN, or may come from the master node MN in the multi-connectivity architecture.

It should also be noted that the configuration information sent by the network-side device (which is specifically the source node or the master node MN in the multi-connectivity architecture) to the terminal device may be sent by using a radio resource control (RRC) message. Correspondingly, the configuration information received by the terminal device is also received by using the RRC message.

It can be understood that because the configuration information sent by the network-side device to the terminal device is used to reconfigure a data radio bearer (DRB) of the terminal device, the configuration information may also be referred to as reconfiguration information, and a configuration procedure initiated by the network-side device by sending the configuration information may also be referred to as a reconfiguration procedure.

In this embodiment of this disclosure, the configuration information received by the terminal device by performing step 101 includes first connectivity configuration information and second connectivity configuration information, where the first connectivity configuration information is used to maintain both a connection to the source node and a connection to the target node in a service node updating procedure, and the second connectivity configuration information is used to release the connection to the source node and connect to the target node. The following describes in detail the specific service node updating procedure performed by the terminal device based on the configuration information.

Step 103: Process, by applying the first connectivity configuration information, a layer 2 protocol entity corresponding to a bearer between the terminal device and the source node, to reconfigure the bearer as a source node split bearer.

After the terminal device receives the configuration information (which may also be referred to as an RRC reconfiguration message) delivered by the network-side device, the terminal device may perform the reconfiguration by applying the first connectivity configuration information, to reconfigure the bearer (which is specifically a data radio bearer (DRB)) between the terminal device and the source node as the source node split bearer. In this reconfiguration procedure, the terminal device may perform the following processing on the layer 2 protocol entity corresponding to the bearer:

reconfiguring a Packet Data Convergence Protocol (PDCP) entity of the bearer in a source node cell group of the source node;

keeping a radio link control (RLC) entity of the bearer in the source node cell group unchanged;

keeping a medium access control (MAC) entity of the bearer in the source node cell group unchanged;

establishing an RLC entity of the bearer in a target node cell group of the target node; and establishing a MAC entity of the bearer in the target node cell group.

It may be understood that in the process of reconfiguring the bearer between the terminal device and the source node based on the first connectivity configuration information, the terminal device reconfigures the Packet Data Convergence Protocol (PDCP) entity of the bearer in the cell group of the source node. Optionally, reconfiguring the PDCP entity may be applying, to the PDCP entity, a split bearer threshold carried in the first connectivity configuration information, so that the PDCP entity can determine, based on the split bearer threshold, whether to use the source node or the target node to perform data transmission and reception over the source node split bearer.

In the process of reconfiguring the bearer between the terminal device and the source node based on the first connectivity configuration information, the terminal device keeps both the radio link control (RLC) entity of the bearer in the source node cell group and the medium access control (MAC) entity of the bearer in the source node cell group unchanged, so that the source node can normally transmit and receive data in the service node updating procedure.

In the process of reconfiguring the bearer between the terminal device and the source node based on the first connectivity configuration information, the terminal device further establishes the RLC entity of the bearer in the target node cell group of the target node and the MAC entity of the bearer in the target node cell group, so that the target node can perform data transmission and reception in the service node updating procedure.

It should be noted that because the terminal device applies the first connectivity configuration information, the terminal device is enabled to maintain both the connection to the source node and the connection to the target node in the service node updating procedure. Therefore, the first connectivity configuration information may be referred to as dual-connectivity configuration (DC configuration) information.

Step 105: Process, by applying the second connectivity configuration information, a layer 2 protocol entity corresponding to the bearer, to reconfigure the source node split bearer as a target node bearer.

After the terminal device reconfigures the bearer between the terminal device and the source node as the source node split bearer, the terminal device may further perform the reconfiguration based on the second connectivity configuration information in the configuration information delivered by the network-side device, to reconfigure the source node split bearer as the target node bearer. In this reconfiguration procedure, the terminal device may perform the following processing on the layer 2 protocol entity corresponding to the bearer:

reconfiguring a PDCP entity of the bearer in a source node cell group of the source node as a PDCP entity in a target node cell group of the target node;

releasing an RLC entity of the bearer in the source node cell group;

releasing a MAC entity of the bearer in the source node cell group;

keeping an RLC entity of the bearer in the target node cell group unchanged; and keeping a MAC entity of the bearer in the target node cell group unchanged.

It may be understood that in the process of reconfiguring the source node split bearer as the target node bearer based on the second connectivity configuration information, the terminal device reconfigures the PDCP entity of the bearer in the source node cell group of the source node as the PDCP entity in the target node cell group of the target node, so that the target node can perform data transmission and reception with the terminal device.

In the process of reconfiguring the source node split bearer as the target node bearer based on the second connectivity configuration information, the terminal device further keeps the RLC entity and the MAC entity of the bearer in the target node cell group unchanged, so that the terminal device can normally perform data transmission and reception with the target node.

In the process of reconfiguring the source node split bearer as the target node bearer based on the second connectivity configuration information, the terminal device releases the RLC entity and MAC entity of the bearer in the source node cell group, while establishing a connection to the target node, so that the connection between the terminal device and the source node can be completely released. Up to now, service node updating is complete.

Optionally, when the terminal device releases the RLC entity of the bearer in the source node cell group, a specific procedure also varies depending on different types of the RLC entity. Specifically, if the RLC entity of the bearer in the source node cell group is an RLC entity of a long term evolution (LTE) type, after the RLC entity is reestablished, the RLC entity is released. Specifically, if the RLC entity of the bearer in the source node cell group is an RLC entity of a new radio NR type, the RLC entity may be directly released.

It should be noted that because the terminal device applies the second connectivity configuration information, the terminal device is enabled to release the connection to the source node and connect to the target node. Therefore, the second connectivity configuration information may be referred to as single-connectivity configuration (SC configuration) information.

It may be understood that because the terminal device performs step 103 to reconfigure the bearer between the terminal device and the source node as the source node split bearer by applying the first connectivity configuration information, the terminal device is enabled to maintain both the connection to the source node and the connection to the target node in the service node updating procedure. Because the terminal device performs step 105 to reconfigure the source node split bearer as the target node bearer by applying the second connectivity configuration information, the terminal device is enabled to release the connection to the source node and maintain only the connection to the target node. Therefore, the terminal device does not need to be disconnected from the source node during service node updating, but is disconnected from the source node after the service node is successfully updated to the target node, so that user plane data can be continuous without interruption In this embodiment of this disclosure, the terminal device may further send indication information to the source node, where the indication information is used to indicate whether the terminal device has applied the first connectivity configuration information.

Correspondingly, after the source node receives the indication information, the source node can learn whether the terminal device has applied the first connectivity configuration information. In addition, in a case in which the terminal device has reconfigured the bearer between the terminal device and the source node as the source node split bearer by applying the first connectivity configuration information, the source node sends a second source node status transfer message to the target node, and forwards data received from the source node split bearer to the target node, where the second source node status transfer message is used to notify a data receiving status of the source node to the target node.

Optionally, the indication information sent by the terminal device to the source node may be included in a PDCP subheader (subheader). In other words, when sending the indication information to the source node, the terminal device may send the indication information to the source node by using the PDCP subheader of the data packet.

Optionally, the indication information in the PDCP subheader of the data packet may be reflected by using a preset indication bit in the current PDCP subheader. For example, if a value of the preset indication bit in the subheader is "1", it indicates that the terminal device has applied the first connectivity configuration information; or if a value of the preset indication bit in the subheader is "0", it indicates that the terminal device has not applied the first connectivity configuration information.

It may be understood that the indication information sent by the terminal device to the source node may be sent for a plurality of times. Preferably, after reconfiguring the bearer between the terminal device and the source node as the source node split bearer by applying the first connectivity configuration information, the terminal device may set the indication information in a PDCP subheader of a data packet, so that the indication information indicates that the terminal device has applied the first connectivity configuration information; and then the terminal device may further send the indication information to the source node, to indicate that the terminal device has applied the first connectivity configuration information.

Preferably, when the bearer between the terminal device and the source node is a bearer in a determined mode, after processing, by applying the second connectivity configuration information, the layer 2 protocol entity corresponding to the bearer, to reconfigure the source node split bearer as the target node bearer, the terminal device may further send a PDCP status report (PDCP status report) to the target node, to notify a data receiving status of the terminal device to the target node.

It should be noted that a function of sending the PDCP status report to the target node when the terminal device satisfies a trigger condition (the trigger condition herein is specifically that the terminal device has reconfigured the source node split bearer as the target node bearer by applying the second connectivity configuration information) is a function that may be configured by using an RRC message. Therefore, the network-side device can configure the function in an RRC message sent to the terminal device.

In this embodiment of this disclosure, after the terminal device receives the configuration information, the terminal device reconfigures the bearer between the terminal device and the source node as the source node split bearer by applying the first connectivity configuration information used to maintain both the connection to the source node and the connection to the target node in the service node updating procedure, and reconfigures the source node split bearer as the target node bearer by applying the second connectivity configuration information used to release the connection to the source node and connect to the target node. Therefore, according to the solution provided by this embodiment of this disclosure, in the service node updating procedure, by using the source node split bearer, the terminal device does not need to be disconnected from the source node during service node updating, but is disconnected from the source node after the service node is successfully updated to the target node, so that user plane data can be continuous without interruption.

Embodiment 2

Figure 2:
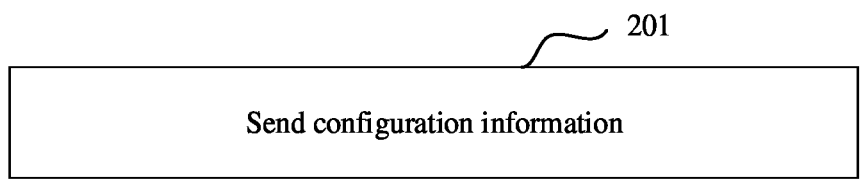
FIG. 2 is a schematic flowchart of a service node updating method performed by a source node according to an embodiment of this disclosure.

Referring to FIG. 2, corresponding to the service node updating method performed by the terminal device and a service node updating method performed by a target node, this embodiment of this disclosure provides a service node updating method performed by a network-side device, where the network-side device includes a source node in a service node updating procedure. The method includes the following step.

Step 201: Send configuration information, where the configuration information includes first connectivity configuration information used to maintain both a connection to the source node and a connection to a target node in the service node updating procedure and second connectivity configuration information used to release the connection to the source node and connect to the target node.

It may be understood that the configuration information sent by the source node by performing step 201 corresponds to the configuration information received by the terminal device by performing step 101 in Embodiment 1. Descriptions about the configuration information in Embodiment 1 are all applicable. Details are not described again herein.

It may be understood that after the terminal device applies the first connectivity configuration information, the terminal device maintains both the connection to the source node and the connection to the target node. Therefore, the source node and the target node can both perform data transmission and reception with the terminal device. Therefore, the source node needs to synchronize a status of data transmission and reception between the source node and the terminal device to the target node. Specifically, the status may include a sending status of downlink data sent by the source node to the terminal device and a receiving status of uplink data received from the terminal device.

Figure 3:
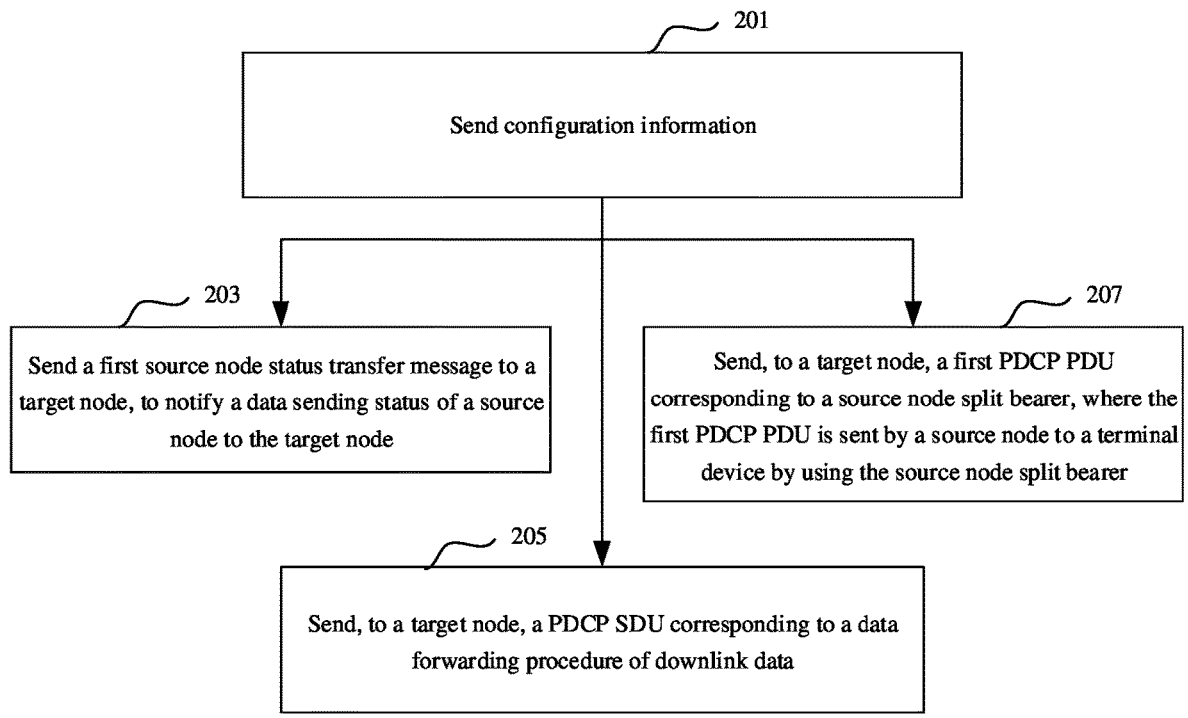
FIG. 3 is another schematic flowchart of a service node updating method performed by a source node according to an embodiment of this disclosure.

For the downlink data sent by the source node to the terminal device, the source node may initiate a source node status transfer (SN Status transfer) procedure after sending the configuration information to the terminal device. In this procedure, referring to FIG. 3, the source node may perform step 203 to send a first source node status transfer (SN Status transfer) message to the target node, to notify a data sending status of the source node to the target node. The source node may further perform step 205 to send, to the target node, a PDCP service data unit SDU corresponding to a data forwarding (Data forwarding) procedure of the downlink data. The source node may further perform step 207 to send, to the target node, a first PDCP protocol data unit PDU corresponding to a source node split bearer, where the first PDCP PDU is sent by the source node to the terminal device by using the source node split bearer.

In a specific implementation, before the source node sends, to the target node, the PDCP service data unit SDU corresponding to the downlink data forwarding (Data forwarding) procedure, the source node may first establish a first tunnel (tunnel) between the source node and the target node, where the tunnel is used to carry the PDCP SDU corresponding to the downlink data forwarding procedure.

In a specific implementation, before the source node sends, to the target node, the first PDCP protocol data unit (PDU) corresponding to the source node split bearer, the source node may first establish a second tunnel (tunnel) between the source node and the target node, where the tunnel is used to carry the first PDCP PDU corresponding to the source node split bearer.

It may be understood that the PDCP SDU forwarded by the source node to the target node may include original downlink data that the source node intends to send to the terminal device but has not processed, and may further include original downlink data that the source node has sent to the terminal device but no message returned by the terminal device about successful reception of which has been received. The first PDCP PDU forwarded by the source node to the target node includes the downlink data sent by the source node to the terminal device by using the source node split bearer.

It can be understood that the source node can synchronize, to the target node by sending the foregoing data and message to the target node, a status of the downlink data sent by the source node to the terminal device, thereby ensuring continuity of user plane data transmission and satisfying a service requirement of service data.

Figure 4:
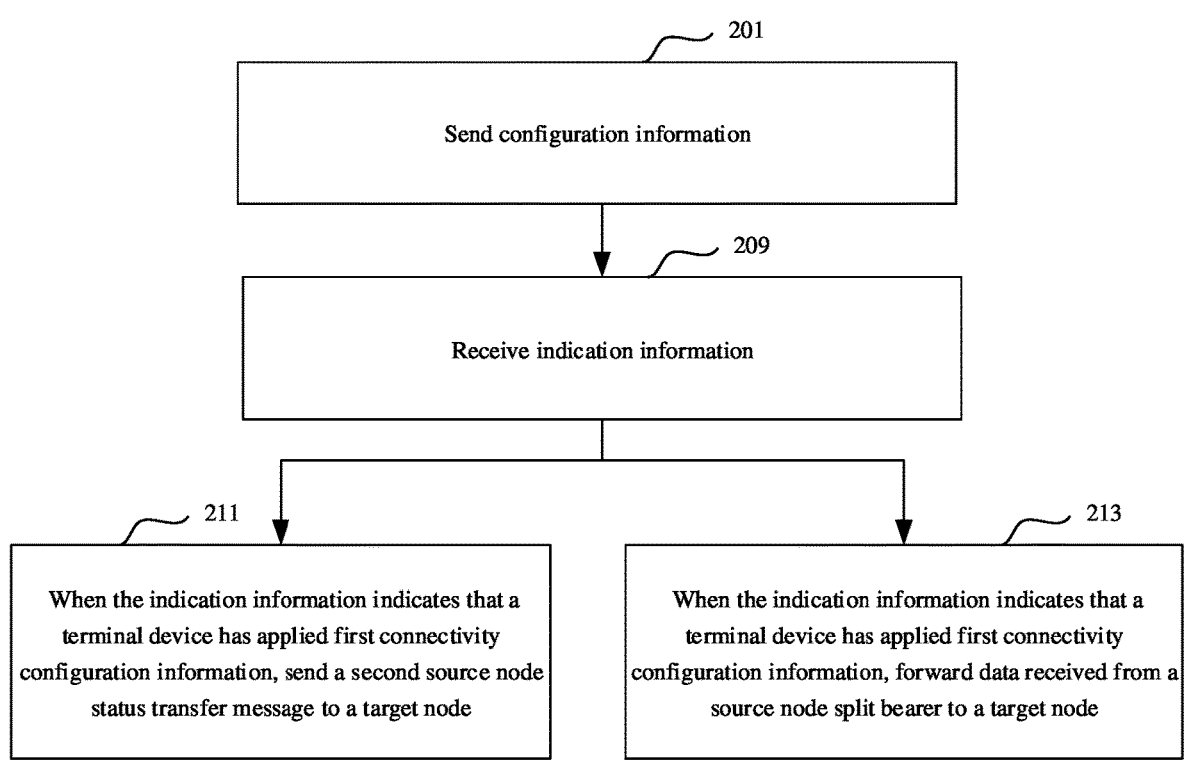
FIG. 4 is still another schematic flowchart of a service node updating method performed by a source node according to an embodiment of this disclosure.

In this embodiment of this disclosure, referring to FIG. 4, after the source node sends the configuration information, the source node may further perform step 209 to receive indication information from the terminal device, where the indication information is used to indicate whether the terminal device has applied the first connectivity configuration information. It may be understood that the indication information received by the source node corresponds to the indication information sent by the terminal device. Therefore, descriptions about the indication information in Embodiment 1 are all applicable. Details are not described again herein.

After the source node receives the indication information, when the indication information indicates that the terminal device has applied the first connectivity configuration information, it indicates that the terminal node has reconfigured the bearer between the terminal device and the source node as the source node split bearer. Therefore, the terminal node can either send data to the source node, or send data to the target node.

Therefore, for the uplink data received by the source node from the terminal device, referring to FIG. 4, in a case in which the indication information indicates that the terminal device has applied the first connectivity configuration information, the source node may perform step 211 to send a second source node status transfer message to the target node, where the second source node status transfer message is used to notify a data receiving status of the source node to the target node; and the source node may further perform step 213 to forward data received from the source node split bearer to the target node (that is, the source node performs a data forwarding procedure of the uplink data).

It can be understood that the source node can synchronize, to the target node by sending the foregoing data and message to the target node, a status of the uplink data received by the source node from the terminal device, thereby ensuring continuity of user plane data transmission and satisfying a service requirement of service data.

Optionally, after the source node sends the configuration information to the terminal device, the source node may further send PDCP receiving status information of the terminal device to the target node, to notify a PDCP receiving status of the terminal device to the target node.

It should be noted that before the source node sends the PDCP receiving status information of the terminal device to the target node, the source node needs to first determine the PDCP receiving status information of the terminal device. Specifically, the source node may determine the PDCP receiving status information of the terminal device based on at least one of hybrid automatic repeat request (HARQ) information at a MAC layer or an RLC status report received at an RLC layer. It may be understood that the PDCP receiving status information of the terminal device, determined by the source node based on the HARQ information at the MAC layer and/or the RLC status report received at the RLC layer, can reflect the PDCP receiving status of the terminal device to some extent. Therefore, sending the PDCP receiving status information to the target node can help the target node learn the PDCP receiving status of the terminal device.

In this embodiment of this disclosure, the source node sends the configuration information to the terminal device, so that after the terminal device receives the configuration information, the terminal device can reconfigure the bearer between the terminal device and the source node as the source node split bearer by applying the first connectivity configuration information used to maintain both the connection to the source node and the connection to the target node in the service node updating procedure and then reconfigure the source node split bearer as a target node bearer by applying the second connectivity configuration information used to release the connection to the source node and connect to the target node. Therefore, according to the solution provided by this embodiment of this disclosure, in the service node updating procedure, by using the source node split bearer, the terminal device does not need to be disconnected from the source node during service node updating, but is disconnected from the source node after a service node is successfully updated to the target node, so that user plane data can be continuous without interruption.

On this basis, the source node further synchronizes, to the target node, the downlink data sent to the terminal device and the uplink data received from the terminal device after an RRC reconfiguration procedure is initiated to the terminal device. This further ensures continuity of user plane data transmission and can satisfy a service requirement of service data in the service node updating procedure.

Embodiment 3

Figure 5:
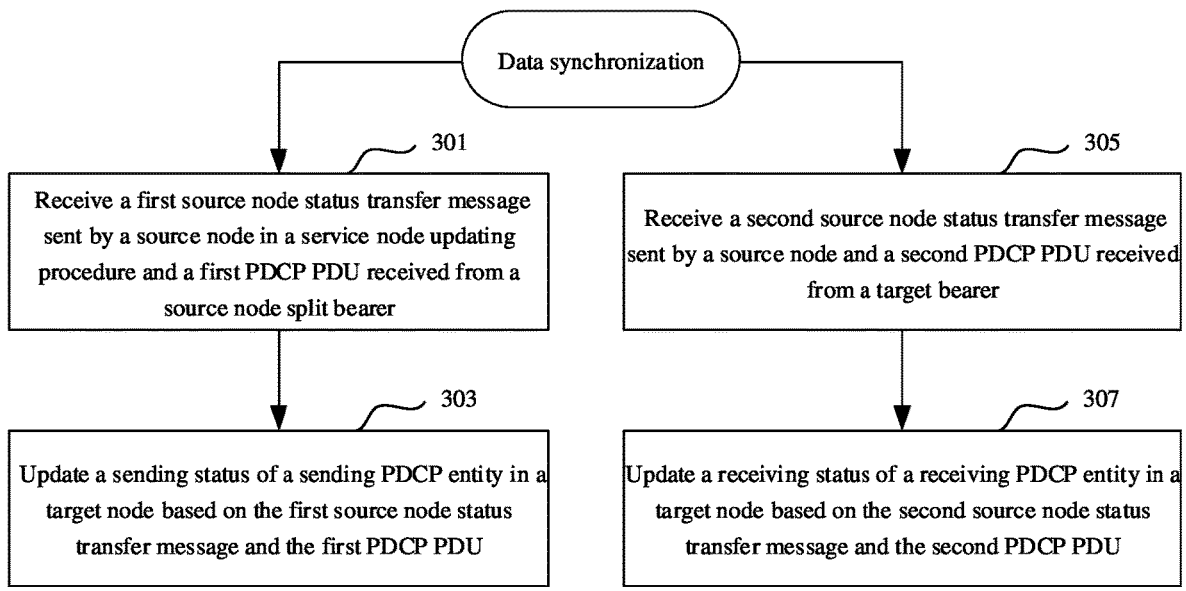
FIG. 5 is a schematic flowchart of a service node updating method performed by a target node according to an embodiment of this disclosure.

Referring to FIG. 5, corresponding to the service node updating method performed by the terminal device and the service node updating method performed by the source node, this embodiment of this disclosure further provides a service node updating method performed by a network-side device, where the network-side device includes a target node in a service node updating procedure. The method includes the following steps.

Step 301: Receive a first source node status transfer message sent by a source node in the service node updating procedure and a first PDCP PDU received from a source node split bearer.

It can be understood that the first source node status transfer (SN status transfer) message coming from the source node and received by the target node by performing step 301 corresponds to the first source node status transfer message sent by the source node to the target node by performing step 203 in Embodiment 2, and the first PDCP PDU coming from the source node and received by the target node from the source node split bearer by performing step 301 corresponds to the first PDCP PDU sent by the source node to the target node by performing step 207 in Embodiment 2. Details are not described again herein.

Step 303: Update a sending status of a sending PDCP entity in the target node based on the first source node status transfer message and the first PDCP PDU.

Based on the first source node status transfer message and the first PDCP PDU that are sent by the source node, the target node can learn a status of data sent by the source node to a terminal device after an RRC reconfiguration procedure is initiated. Therefore, the target node can update the sending status of the sending PDCP entity in the target node accordingly, so that an updated sending status can completely reflect a status of data sent by the network-side device to the terminal device.

Step 305: Receive a second source node status transfer message sent by the source node and a second PDCP PDU received from a target bearer.

It can be understood that the second source node status transfer (SN status transfer) message coming from the source node and received by the target node by performing step 305 corresponds to the second source node status transfer message sent by the source node to the target node by performing step 211 in Embodiment 2. Details are not described again herein.

Step 307: Update a receiving status of a receiving PDCP entity in the target node based on the second source node status transfer message and the second PDCP PDU.

Based on the second source node status transfer message and the second PDCP PDU, the target node can learn a status of data received by the source node from the terminal device after the RRC reconfiguration procedure is initiated. Therefore, the target node can update the receiving status of the receiving PDCP entity in the target node accordingly, so that an updated receiving status can completely reflect a status of data received by the network-side device from the terminal device.

In addition, the target node may further receive PDCP receiving status information of the terminal device that is sent by the source node, to learn a status of downlink data received by the terminal device from the network side. It may be understood that the PDCP receiving status information received by the target node corresponds to the PDCP receiving status information sent by the source node. Details are not described again herein.

In addition, the target node may further receive a PDCP status report sent by the terminal device, to learn a status of downlink data received by the terminal device from the network side. It may be understood that the PDCP status report received by the target node corresponds to the PDCP status report sent by the terminal device. Details are not described again herein.

On a basis of receiving at least one of the PDCP receiving status information or the PDCP status report, the target node may further resend, based on the at least one of the PDCP receiving status information or the PDCP status report, data not successfully received by the terminal device to the terminal device, to implement reliable transmission of user plane data.

Embodiment 4

Figure 6:
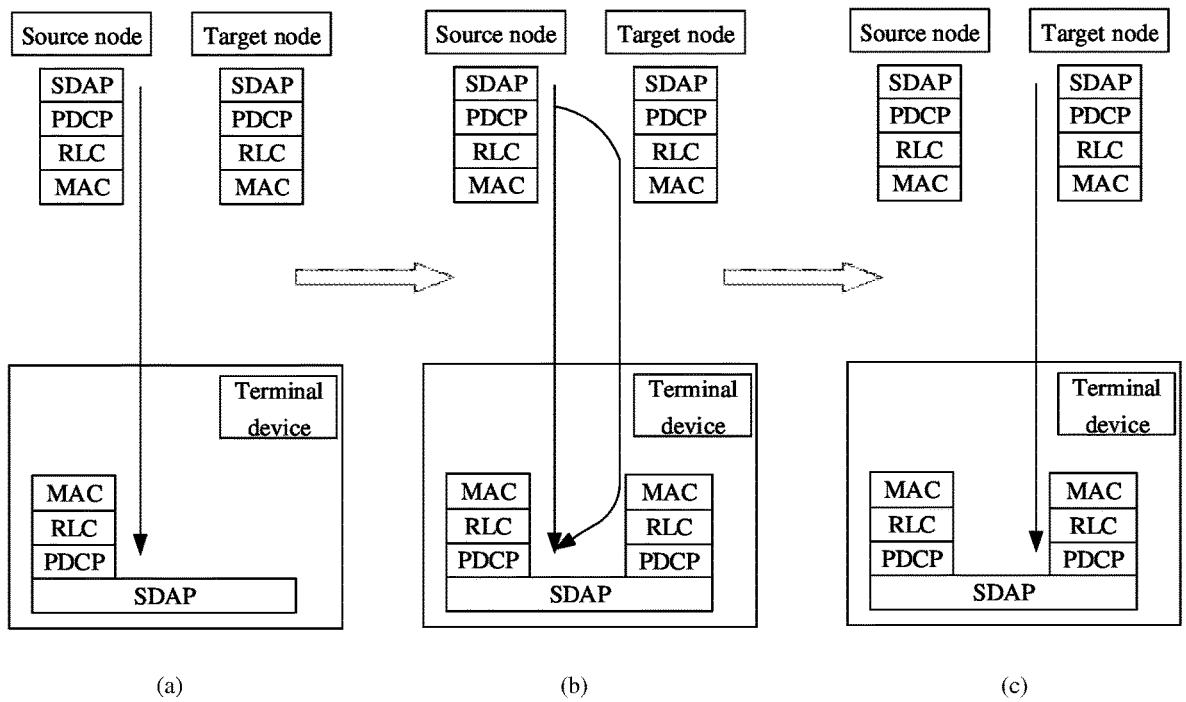
FIG. 6 is a schematic diagram of a link for downlink data in a service node updating procedure according to an embodiment of this disclosure.

Referring to FIG. 6, in a service node updating procedure, before a source node initiates an RRC reconfiguration procedure, a network-side device (only a source node in this case) sends downlink data to a terminal device based on a data link shown in FIG. 6(*a*).

After the source node sends configuration information to the terminal device and the terminal device reconfigures a bearer between the terminal device and the source node as a source node split bearer based on first connectivity configuration information, the terminal device maintains both a connection to the source node and a connection to a target node in the service node updating procedure. Therefore, the network-side device (including the source node and the target node) sends downlink data to the terminal device based on data links shown in FIG. 6(*b*).

After the terminal device reconfigures the source node split bearer as a target node bearer based on second connectivity configuration information, the terminal device releases the connection to the source node and connects to the target node. Therefore, the network-side device (only the target node in this case) sends downlink data to the terminal device based on a data link shown in FIG. 6(*c*).

Figure 7:
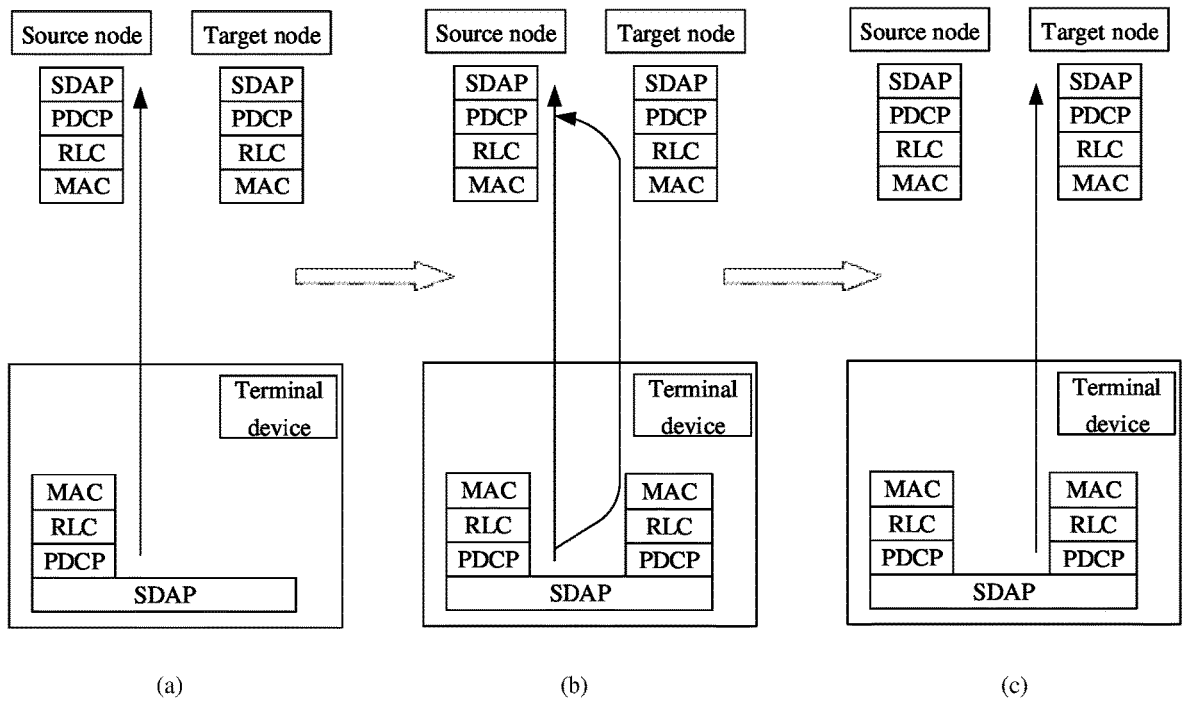
FIG. 7 is a schematic diagram of a link for uplink data in a service node updating procedure according to an embodiment of this disclosure.

Referring to FIG. 7, in the service node updating procedure, before the source node initiates the RRC reconfiguration procedure, the network-side device (only the source node in this case) receives uplink data from the terminal device based on a data link shown in FIG. 7(*a*).

After the source node sends the configuration information to the terminal device and the terminal device reconfigures the bearer between the terminal device and the source node as the source node split bearer based on the first connectivity configuration information, the terminal device maintains both the connection to the source node and the connection to the target node in the service node updating procedure. Therefore, the network-side device (including the source node and the target node) receives uplink data from the terminal device based on data links shown in FIG. 7(*b*).

After the terminal device reconfigures the source node split bearer as the target node bearer based on the second connectivity configuration information, the terminal device releases the connection to the source node and connects to the target node. Therefore, the network-side device (only the target node in this case) receives uplink data from the terminal device based on a data link shown in FIG. 7(*c*).

In this embodiment of this disclosure, the source node sends the configuration information to the terminal device, so that after the terminal device receives the configuration information, the terminal device can reconfigure the bearer between the terminal device and the source node as the source node split bearer by applying the first connectivity configuration information used to maintain both the connection to the source node and the connection to the target node in the service node updating procedure and then reconfigure the source node split bearer as a target node bearer by applying the second connectivity configuration information used to release the connection to the source node and connect to the target node. Therefore, according to the solution provided by this embodiment of this disclosure, in the service node updating procedure, by using the source node split bearer, the terminal device does not need to be disconnected from the source node during service node updating, but is disconnected from the source node after a service node is successfully updated to the target node, so that user plane data can be continuous without interruption.

On this basis, the source node further synchronizes, to the target node, the downlink data sent to the terminal device and the uplink data received from the terminal device after the RRC reconfiguration procedure is initiated to the terminal device. This further ensures continuity of user plane data transmission and can satisfy a service requirement of service data in the service node updating procedure.

Embodiment 5

Figure 8:
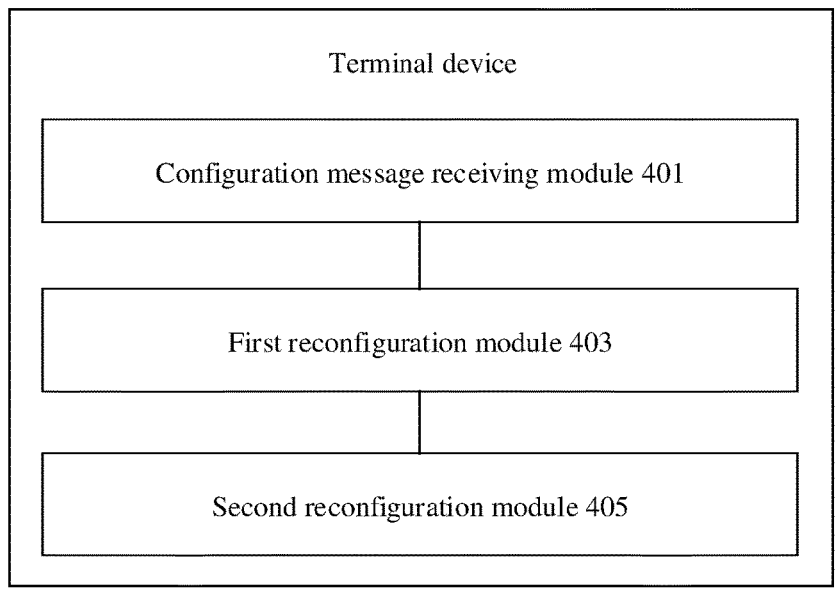
FIG. 8 is a schematic structural diagram of a terminal device according to an embodiment of this disclosure.

Referring to FIG. 8, corresponding to the service node updating method provided by Embodiment 1, this embodiment of this disclosure further provides a terminal device, which can implement the service node updating method in Embodiment 1. The terminal device includes:
- a configuration message receiving module 401, configured to receive configuration information, where the configuration information includes first connectivity configuration information used to maintain both a connection to a source node and a connection to a target node in a service node updating procedure and second connectivity configuration information used to release the connection to the source node and connect to the target node;
- a first reconfiguration module 403, configured to process, by applying the first connectivity configuration information, a layer 2 protocol entity corresponding to a bearer between the terminal device and the source node, to reconfigure the bearer as a source node split bearer; and
- a second reconfiguration module 405, configured to process, by applying the second connectivity configuration information, a layer 2 protocol entity corresponding to the bearer, to reconfigure the source node split bearer as a target node bearer.

Preferably, the first reconfiguration module 403 may specifically include:
- a first reconfiguration unit, configured to reconfigure a Packet Data Convergence Protocol (PDCP) entity of the bearer in a source node cell group of the source node;
- a first keeping unit, configured to keep a radio link control (RLC) entity of the bearer in the source node cell group unchanged;
- a second keeping unit, configured to keep a medium access control (MAC) entity of the bearer in the source node cell group unchanged;
- a first establishing unit, configured to establish an RLC entity of the bearer in a target node cell group of the target node; and
- a second establishing unit, configured to establish a MAC entity of the bearer in the target node cell group.

Preferably, the second reconfiguration module 405 may specifically include:
- a second reconfiguration unit, configured to reconfigure a PDCP entity of the bearer in a source node cell group of the source node as a PDCP entity in a target node cell group of the target node;
- a first releasing unit, configured to release an RLC entity of the bearer in the source node cell group;
- a second releasing unit, configured to release a MAC entity of the bearer in the source node cell group;
- a third keeping unit, configured to keep an RLC entity of the bearer in the target node cell group unchanged; and
- a fourth keeping unit, configured to keep a MAC entity of the bearer in the target node cell group unchanged.

Preferably, the first releasing unit may specifically include at least one of the following:
- a reestablishing and releasing subunit, configured to release the RLC entity after reestablishing the RLC entity if the RLC entity is an RLC entity of a long term evolution (LTE) type; or
- a direct releasing subunit, configured to directly release the RLC entity if the RLC entity is an RLC entity of a new radio NR type.

Preferably, the terminal device may further include:
- an indication information sending module, configured to send indication information to the source node, where the indication information is used to indicate whether the terminal device has applied the first connectivity configuration information.

Preferably, the indication information sending module may be specifically configured to send the indication information to the source node by using a PDCP subheader of a data packet.

Preferably, the indication information sending module may specifically include:
- an indication information setting unit, configured to set the indication information in a PDCP subheader of a data packet after the layer 2 protocol entity corresponding to the bearer between the terminal device and the source node is processed by applying the first connectivity configuration information and the bearer is reconfigured as the source node split bearer; and
- an indication information sending unit, configured to send the indication information to the source node, to indicate that the terminal device has applied the first connectivity configuration information.

Preferably, when the bearer is a bearer in a determined mode, the terminal device may further include:
- a status report sending module, configured to send a PDCP status report to the target node.

It can be understood that the terminal device provided by this embodiment of this disclosure can implement the foregoing service node updating method in Embodiment 1. Descriptions about the service node updating method in Embodiment 1 are all applicable to this embodiment. Details are not described again herein.

Embodiment 6

Figure 9:
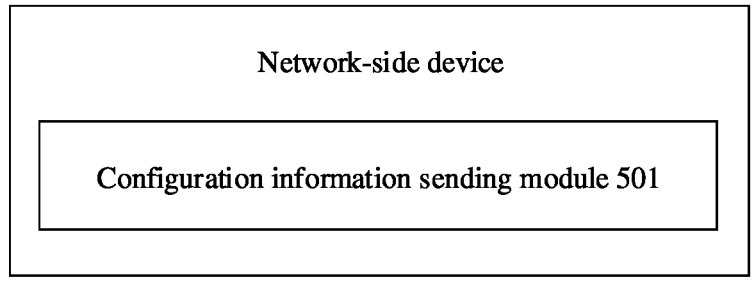
FIG. 9 is a schematic structural diagram of a network-side device according to an embodiment of this disclosure.

Referring to FIG. 9, corresponding to the service node updating method provided by Embodiment 2, this embodiment of this disclosure further provides a network-side device, which can implement the service node updating method in Embodiment 2. The network-side device includes a source node in a service node updating procedure. The network-side device includes:
- a configuration information sending module 501, configured to send configuration information, where the configuration information includes first connectivity configuration information used to maintain both a connection to the source node and a connection to a target node in the service node updating procedure and second connectivity configuration information used to release the connection to the source node and connect to the target node.

Preferably, the source node may further include:

a first source node status transfer message sending module, configured to send a first source node status transfer message to the target node, where the first source node status transfer message is used to notify a data sending status of the source node to the target node;

a PDCP SDU forwarding module, configured to send, to the target node, a PDCP service data unit (SDU) corresponding to a downlink data forwarding procedure; and a PDCP PDU sending module, configured to send, to the target node, a first PDCP protocol data unit PDU corresponding to a source node split bearer, where the first PDCP PDU is sent by the source node to a terminal device by using the source node split bearer.

Preferably, the source node may further include:

a first tunnel establishing module, configured to establish a first tunnel between the source node and the target node, where the first tunnel is used to carry the PDCP SDU corresponding to the downlink data forwarding procedure.

Preferably, the source node may further include:

a second tunnel establishing module, configured to establish a second tunnel between the source node and the target node, where the second tunnel is used to carry the first PDCP PDU corresponding to the source node split bearer.

Preferably, the source node may further include:

an indication information receiving module, configured to receive indication information, where the indication information is used to indicate whether a terminal device has applied the first connectivity configuration information.

Preferably, the source node may further include:

a second source node status transfer message sending module, configured to send a second source node status transfer message to the target node when the indication information indicates that the terminal device has applied the first connectivity configuration information; and a data receiving and forwarding module, configured to forward data received from a source node split bearer to the target node when the indication information indicates that the terminal device has applied the first connectivity configuration information, where the second source node status transfer message is used to notify a data receiving status of the source node to the target node.

Preferably, the source node may further include:

a receiving status information sending module, configured to send PDCP receiving status information of a terminal device to the target node.

Preferably, the source node may further include:

a receiving status information determining module, configured to determine the PDCP receiving status information of the terminal device based on at least one of hybrid automatic repeat request (HARQ) information at a MAC layer or an RLC status report received at an RLC layer.

Preferably, the network-side device is a master node (MN) in a multi-connectivity architecture.

It can be understood that the network-side device provided by this embodiment of this disclosure can implement the foregoing service node updating method in Embodiment 2. Descriptions about the service node updating method in Embodiment 2 are all applicable to this embodiment. Details are not described again herein.

Embodiment 7

Figure 10:
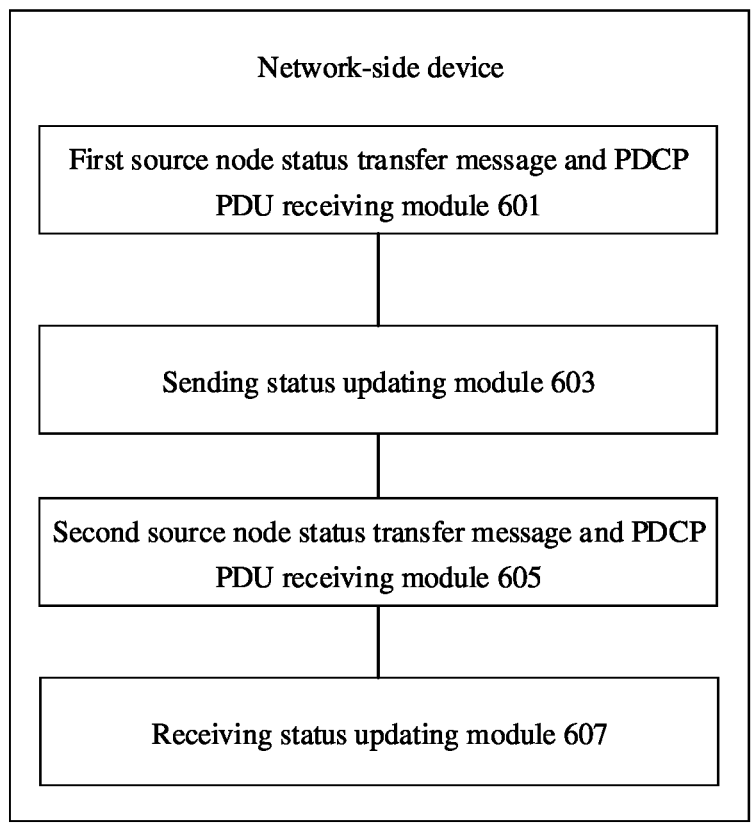
FIG. 10 is a schematic structural diagram of another network-side device according to an embodiment of this disclosure.

Referring to FIG. 10, corresponding to the service node updating method provided by Embodiment 3, this embodiment of this disclosure further provides a network-side device, which can implement the service node updating method in Embodiment 3. The network-side device includes a target node in a service node updating procedure. The network-side device includes:

a first source node status transfer message and PDCP PDU receiving module 601, configured to receive a first source node status transfer message sent by a source node in the service node updating procedure and a first PDCP PDU received from a source node split bearer;

a sending status updating module 603, configured to update a sending status of a sending PDCP entity in the target node based on the first source node status transfer message and the first PDCP PDU;

a second source node status transfer message and PDCP PDU receiving module 605, configured to receive a second source node status transfer message sent by the source node and a second PDCP PDU received from a target bearer; and a receiving status updating module 607, configured to update a receiving status of a receiving PDCP entity in the target node based on the second source node status transfer message and the second PDCP PDU.

Preferably, the network-side device may further include at least one of the following:

a receiving status information receiving unit, configured to receive PDCP receiving status information of a terminal device that is sent by the source node; or a status report receiving unit, configured to receive a PDCP status report sent by a terminal device.

Preferably, the network-side device may further include:

a data resending module, configured to resend, based on at least one of the PDCP receiving status information or the PDCP status report, data not successfully received by the terminal device to the terminal device.

It can be understood that the network-side device provided by this embodiment of this disclosure can implement the foregoing service node updating method in Embodiment 3. Descriptions about the service node updating method in Embodiment 3 are all applicable to this embodiment. Details are not described again herein.

Embodiment 8

Figure 11:
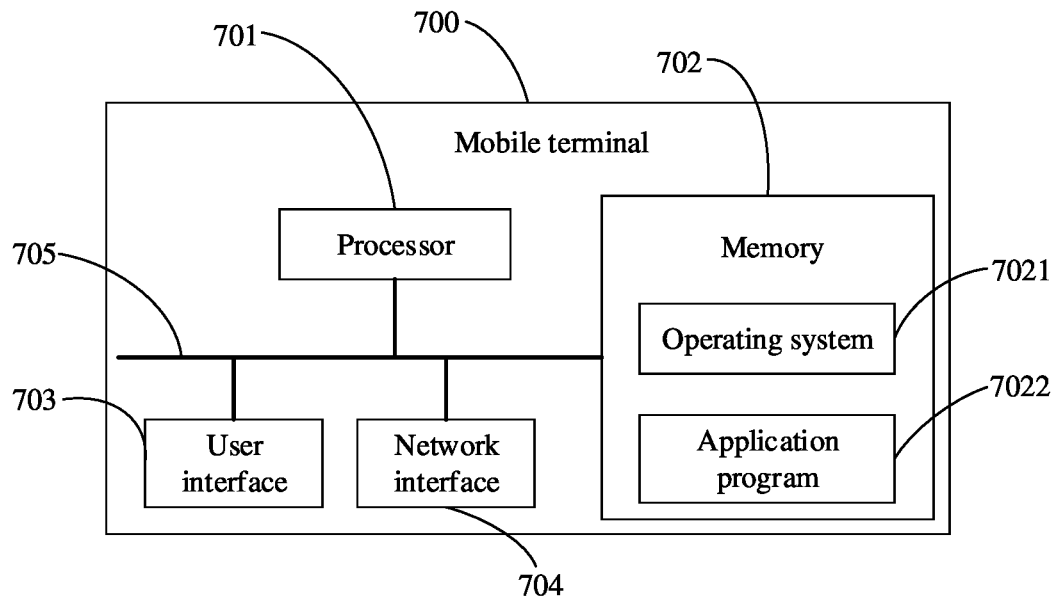
FIG. 11 is a schematic structural diagram of another terminal device according to an embodiment of this disclosure.

FIG. 11 is a block diagram of a terminal device (also referred to as a mobile terminal) according to another embodiment of this disclosure. The terminal device 700 shown in FIG. 11 includes at least one processor 701, a memory 702, at least one network interface 704, and a user interface 703. The components of the terminal device 700 are coupled together by using a bus system 705. It may be understood that the bus system 705 is configured to implement connection and communication between these components. The bus system 705 further includes a power bus, a control bus, and a status signal bus, in addition to a data bus. However, for clear description, various buses in FIG. 11 are marked as the bus system 705.

The user interface 703 may include a display, a keyboard, a pointing device (for example, a mouse or a trackball (trackball)), a touch panel or a touchscreen, or the like.

It may be understood that the memory 702 in this embodiment of this disclosure may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. For illustrative rather than restrictive description, a plurality of forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 702 in a system and method described in this embodiment of this disclosure is intended to include but is not limited to these and any other suitable types of memories.

In some implementations, the memory 702 stores the following elements: an executable module or a data structure, or a subset thereof, or an extended set thereof: an operating system 7021 and an application program 7022.

The operating system 7021 includes various system programs, such as a framework layer, a kernel library layer, and a driver layer, for implementing various basic services and processing hardware-based tasks. The application program 7022 includes various application programs, such as a media player (Media Player) and a browser (Browser), and is configured to implement various application services. A program for implementing the method in this embodiment of this disclosure may be included in the application program 7022.

In this embodiment of this disclosure, the terminal device 700 further includes a computer program stored in the memory 709 and capable of running on the processor 701. When the computer program is executed by the processor 701, the following steps are implemented:

receiving configuration information, where the configuration information includes first connectivity configuration information used to maintain both a connection to a source node and a connection to a target node in a service node updating procedure and second connectivity configuration information used to release the connection to the source node and connect to the target node;

processing, by applying the first connectivity configuration information, a layer 2 protocol entity corresponding to a bearer between the terminal device and the source node, to reconfigure the bearer as a source node split bearer; and processing, by applying the second connectivity configuration information, a layer 2 protocol entity corresponding to the bearer, to reconfigure the source node split bearer as a target node bearer.

The foregoing method disclosed by this embodiment of this disclosure may be applied to the processor 701, or be implemented by the processor 701. The processor 701 may be an integrated circuit chip with a signal processing capability. In an implementation process, the steps of the foregoing method may be implemented by an integrated logical circuit of hardware in the processor 701, or by a software instruction. The processor 701 may be a general purpose processor, a digital signal processor (DSP), an application specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of this disclosure. The general purpose processor may be a microprocessor, or the processor may be any conventional processor or the like. Steps of the methods disclosed with reference to the embodiments of this disclosure may be directly performed and completed by using a hardware decoding processor, or may be performed and completed by using a combination of hardware and a software module in a decoding processor. The software module may be located in a mature computer-readable storage medium in the art, such as a random access memory, a flash memory, a read-only memory, a programmable read-only memory, an electrically erasable programmable memory, or a register. The computer-readable storage medium is located in the memory 702, and the processor 701 reads information from the memory 702 and performs the steps of the foregoing method in combination with hardware of the processor. Specifically, the computer-readable storage medium stores a computer program. When the computer program is executed by the processor 701, the steps of the foregoing service node updating method embodiment are implemented.

It may be understood that the embodiments described in the embodiments of this disclosure may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general purpose processors, controllers, microcontrollers, microprocessors, and other electronic units for performing the functions described in this disclosure, or a combination thereof.

For software implementation, the technologies described in the embodiments of this disclosure may be implemented by modules (for example, processes or functions) that perform the functions described in the embodiments of this disclosure. Software code may be stored in the memory and executed by the processor. The memory may be implemented in or outside the processor.

Preferably, this embodiment of this disclosure further provides a terminal device, including a processor 701, a memory 702, and a computer program stored in the memory 702 and capable of running on the processor 701. When the computer program is executed by the processor 701, each process of the foregoing service node updating method embodiment is implemented, with the same technical effect achieved. To avoid repetition, details are not described again herein.

Embodiment 9

Figure 12:
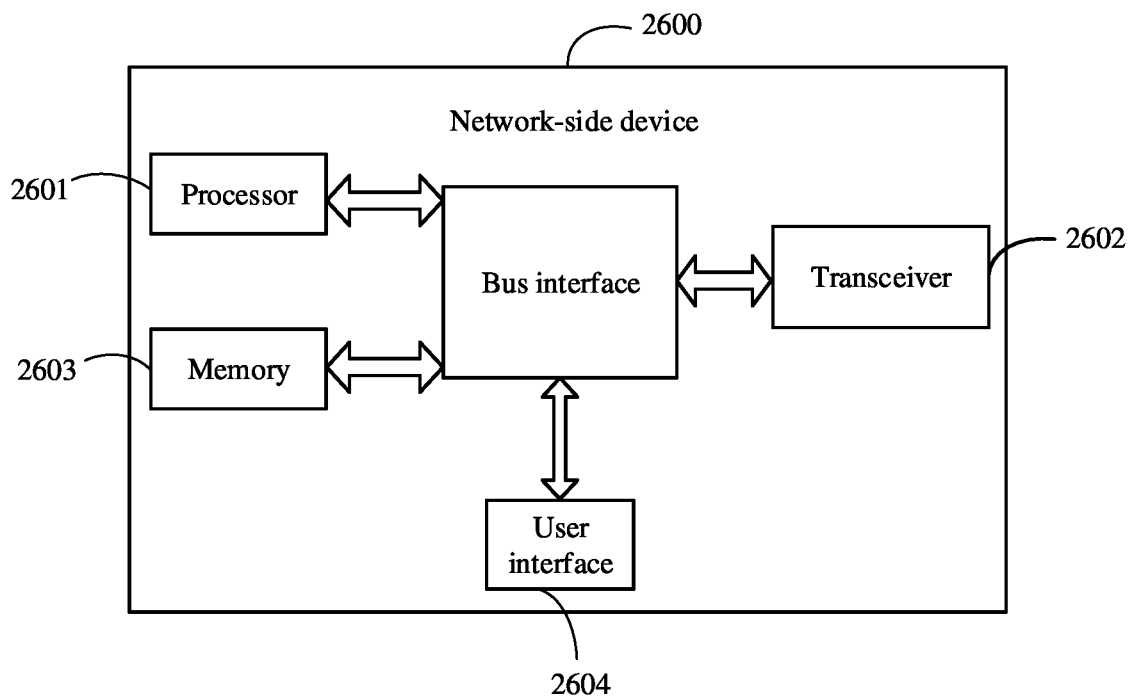
FIG. 12 is a schematic structural diagram of still another network-side device according to an embodiment of this disclosure.

FIG. 12 is a structural diagram of a network-side device according to this embodiment of this disclosure. The network-side device can implement details of the service node updating method in Embodiment 2 and achieve the same effect. As shown in FIG. 12, the network-side device 2600 includes a processor 2601, a transceiver 2602, a memory 2603, a user interface 2604, and a bus interface.

In this embodiment of this disclosure, the network-side device 2600 further includes a computer program stored in the memory 2603 and capable of running on the processor 2601. When the network-side device includes a source node in a service node updating procedure, and when the computer program is executed by the processor 2601, the following step is implemented:

sending configuration information, where the configuration information includes first connectivity configuration information used to maintain both a connection to the source node and a connection to a target node in the service node updating procedure and second connectivity configuration information used to release the connection to the source node and connect to the target node.

When the network-side device includes a target node in a service node updating procedure, and when the computer program is executed by the processor 2601, the following steps are implemented:

receiving a first source node status transfer message sent by a source node in the service node updating procedure and a first PDCP PDU received from a source node split bearer;

updating a sending status of a sending PDCP entity in the target node based on the first source node status transfer message and the first PDCP PDU;

receiving a second source node status transfer message sent by the source node and a second PDCP PDU received from a target bearer; and updating a receiving status of a receiving PDCP entity in the target node based on the second source node status transfer message and the second PDCP PDU.

In FIG. 12, a bus architecture may include any quantity of interconnect buses and bridges, specifically for interconnecting various circuits of one or more processors represented by the processor 2601 and a memory represented by the memory 2603. The bus architecture may further interconnect various other circuits such as a peripheral device, a voltage regulator, and a power management circuit. These are all well known in the art, and therefore are not further described in this specification. The bus interface provides an interface. The transceiver 2602 may be a plurality of components, that is, the transceiver 2602 includes a transmitter and a receiver, and provides a unit for communicating with various other apparatuses on a transmission medium. For different terminal devices, the user interface 2604 may also be an interface that can be externally or internally connected to a required device. The connected device includes but is not limited to a keypad, a display, a speaker, a microphone, a joystick, and the like.

The processor 2601 is responsible for bus architecture management and general processing. The memory 2603 may store data used when the processor 2601 performs an operation.

Embodiment 10

This embodiment of this disclosure further provides a computer-readable storage medium, where a computer program is stored in the computer-readable storage medium. When the computer program is executed by a processor, the procedures of the foregoing service node updating method embodiment are implemented, with the same technical effects achieved. To avoid repetition, details are not described again herein. The computer-readable storage medium is, for example, a read-only memory (ROM for short), a random access memory (RAM for short), a magnetic disk, or an optical disc.

It should be noted that the terms "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. A service node updating method applicable to a service node handover scenario and a secondary node change scenario, performed by a terminal device and comprising:

receiving configuration information, wherein the configuration information comprises first connectivity configuration information used to maintain both a connection to a source node and a connection to a target node in a service node updating procedure and second connectivity configuration information used to release the connection to the source node and connect to the target node;

processing, by applying the first connectivity configuration information, a layer 2 protocol entity corresponding to a bearer between the terminal device and the source node, to reconfigure the bearer as a source node split bearer; and processing, by applying the second connectivity configuration information, a layer 2 protocol entity corresponding to the bearer, to reconfigure the source node split bearer as a target node bearer;

wherein the processing, by applying the first connectivity configuration information, a layer 2 protocol entity corresponding to a bearer between the terminal device and the source node comprises:

reconfiguring a Packet Data Convergence Protocol (PDCP) entity of the bearer in a source node cell group of the source node;

keeping a radio link control (RLC) entity of the bearer in the source node cell group unchanged;

keeping a medium access control (MAC) entity of the bearer in the source node cell group unchanged;

establishing an RLC entity of the bearer in a target node cell group of the target node; and establishing a MAC entity of the bearer in the target node cell group.

2. The method according to claim 1, wherein the processing, by applying the second connectivity configuration information, a layer 2 protocol entity corresponding to the bearer comprises:

reconfiguring a PDCP entity of the bearer in a source node cell group of the source node as a PDCP entity in a target node cell group of the target node;

releasing an RLC entity of the bearer in the source node cell group;

releasing a MAC configuration of the bearer in the source node cell group;

keeping an RLC entity of the bearer in the target node cell group unchanged; and keeping a MAC entity of the bearer in the target node cell group unchanged.

3. The method according to claim 2, wherein the releasing an RLC entity of the bearer in the source node cell group comprises at least one of the following:

if the RLC entity is an RLC entity of a long term evolution (LTE) type, after reestablishing the RLC entity, releasing the RLC entity; or if the RLC entity is an RLC entity of a new radio NR type, directly releasing the RLC entity.

4. The method according to claim 1, wherein in the service node handover scenario, the source node is a source base station, and the target node is a target base station; in the secondary node change scenario, the source node is a source secondary node SN, and the target node is a target secondary node SN.

5. The method according to claim 1, wherein the receiving configuration information comprises: receiving the configuration information through a radio resource control (RRC) message.

6. The method according to claim 1, wherein the reconfiguring the PDCP entity is applying, to the PDCP entity, a split bearer threshold carried in the first connectivity configuration information, to enable the PDCP entity to determine, based on the split bearer threshold, whether to use the source node or the target node to perform data transmission and reception over the source node split bearer.

7. The method according to claim 1, wherein the first connectivity configuration information is dual-connectivity (DC) configuration information, and the second connectivity configuration information is single-connectivity (SC) configuration information.

8. The method according to claim 1, wherein the method further comprises:

sending indication information to the source node, wherein the indication information is used to indicate whether the terminal device has applied the first connectivity configuration information.

9. The method according to claim 8, wherein the sending indication information to the source node is specifically:

sending the indication information to the source node by using a PDCP subheader of a data packet.

10. The method according to claim 9, wherein the indication information in the PDCP subheader of the data packet is reflected by using a preset indication bit in the PDCP subheader;

when a value of the preset indication bit in the subheader is "1", it indicates that the terminal device has applied the first connectivity configuration information;

when the value of the preset indication bit in the subheader is "0", it indicates that the terminal device has not applied the first connectivity configuration information.

11. The method according to claim 8, wherein the sending indication information to the source node specifically comprises:

after the processing, by applying the first connectivity configuration information, a layer 2 protocol entity corresponding to a bearer between the terminal device and the source node, to reconfigure the bearer as a source node split bearer, setting the indication information in a PDCP subheader of a data packet; and sending the indication information to the source node, to indicate that the terminal device has applied the first connectivity configuration information.

12. The method according to claim 1, wherein when the bearer is a bearer in a determined mode, after the processing, by applying the second connectivity configuration information, a layer 2 protocol entity corresponding to the bearer, to reconfigure the source node split bearer as a target node bearer, the method further comprises:

sending a PDCP status report to the target node.

13. A terminal device, comprising a memory, a processor, and a computer program stored in the memory and capable of running on the processor, wherein when the computer program is executed by the processor, the processor is configured to implement a service node updating method applicable to a service node handover scenario and a secondary node change scenario, comprising:

receiving configuration information, wherein the configuration information comprises first connectivity configuration information used to maintain both a connection to a source node and a connection to a target node in a service node updating procedure and second connectivity configuration information used to release the connection to the source node and connect to the target node;

processing, by applying the first connectivity configuration information, a layer 2 protocol entity corresponding to a bearer between the terminal device and the source node, to reconfigure the bearer as a source node split bearer; and processing, by applying the second connectivity configuration information, a layer 2 protocol entity corresponding to the bearer, to reconfigure the source node split bearer as a target node bearer;

wherein the processing, by applying the first connectivity configuration information, a layer 2 protocol entity corresponding to a bearer between the terminal device and the source node comprises:

reconfiguring a Packet Data Convergence Protocol (PDCP) entity of the bearer in a source node cell group of the source node;

keeping a radio link control (RLC) entity of the bearer in the source node cell group unchanged;

keeping a medium access control (MAC) entity of the bearer in the source node cell group unchanged;

establishing an RLC entity of the bearer in a target node cell group of the target node; and establishing a MAC entity of the bearer in the target node cell group.

14. The terminal device according to claim 13, wherein the processing, by applying the second connectivity configuration information, a layer 2 protocol entity corresponding to the bearer comprises:

reconfiguring a PDCP entity of the bearer in a source node cell group of the source node as a PDCP entity in a target node cell group of the target node;

releasing an RLC entity of the bearer in the source node cell group;

releasing a MAC configuration of the bearer in the source node cell group;

keeping an RLC entity of the bearer in the target node cell group unchanged; and keeping a MAC entity of the bearer in the target node cell group unchanged.

15. The terminal device according to claim 14, wherein the releasing an RLC entity of the bearer in the source node cell group comprises at least one of the following:

if the RLC entity is an RLC entity of a long term evolution (LTE) type, after reestablishing the RLC entity, releasing the RLC entity; or if the RLC entity is an RLC entity of a new radio NR type, directly releasing the RLC entity.

16. The terminal device according to claim 13, wherein in the service node handover scenario, the source node is a source base station, and the target node is a target base station; in the secondary node change scenario, the source node is a source secondary node SN, and the target node is a target secondary node SN.

17. The terminal device according to claim 13, wherein the receiving configuration information comprises: receiving the configuration information through a radio resource control (RRC) message.

18. A non-transitory computer-readable storage medium, wherein the non-transitory computer-readable storage medium stores a computer program, and the computer program is executed by a processor to implement a service node updating method applicable to a service node handover scenario and a secondary node change scenario, comprising:

receiving configuration information, wherein the configuration information comprises first connectivity configuration information used to maintain both a connection to a source node and a connection to a target node in a service node updating procedure and second connectivity configuration information used to release the connection to the source node and connect to the target node;

processing, by applying the first connectivity configuration information, a layer 2 protocol entity corresponding to a bearer between the terminal device and the source node, to reconfigure the bearer as a source node split bearer; and processing, by applying the second connectivity configuration information, a layer 2 protocol entity corresponding to the bearer, to reconfigure the source node split bearer as a target node bearer;

wherein the processing, by applying the first connectivity configuration information, a layer 2 protocol entity corresponding to a bearer between the terminal device and the source node comprises:

reconfiguring a Packet Data Convergence Protocol (PDCP) entity of the bearer in a source node cell group of the source node;

keeping a radio link control (RLC) entity of the bearer in the source node cell group unchanged;

keeping a medium access control (MAC) entity of the bearer in the source node cell group unchanged;

establishing an RLC entity of the bearer in a target node cell group of the target node; and establishing a MAC entity of the bearer in the target node cell group.

19. The non-transitory computer-readable storage medium according to claim 18, wherein the processing, by applying the second connectivity configuration information, a layer 2 protocol entity corresponding to the bearer comprises:

reconfiguring a PDCP entity of the bearer in a source node cell group of the source node as a PDCP entity in a target node cell group of the target node;

releasing an RLC entity of the bearer in the source node cell group;

releasing a MAC configuration of the bearer in the source node cell group;

keeping an RLC entity of the bearer in the target node cell group unchanged; and keeping a MAC entity of the bearer in the target node cell group unchanged.

20. The non-transitory computer-readable storage medium according to claim 19, wherein the releasing an RLC entity of the bearer in the source node cell group comprises at least one of the following:

if the RLC entity is an RLC entity of a long term evolution (LTE) type, after reestablishing the RLC entity, releasing the RLC entity; or if the RLC entity is an RLC entity of a new radio NR type, directly releasing the RLC entity.

* * * * *